UNITED STATES PATENT OFFICE.

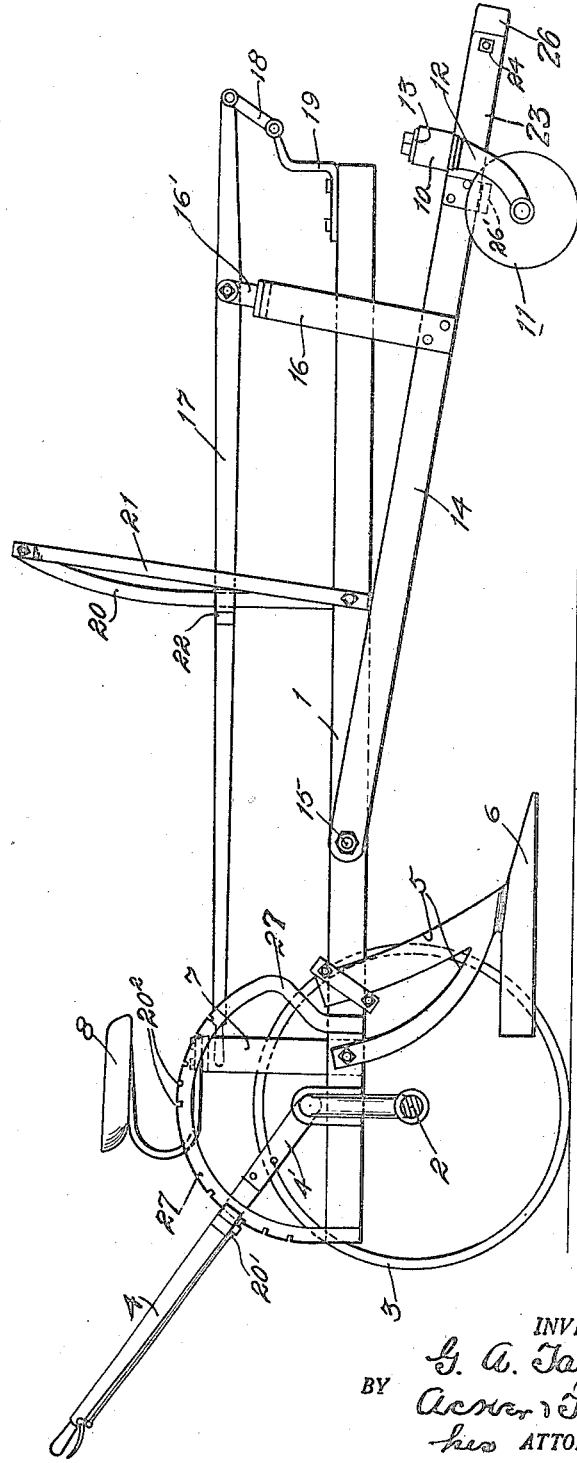

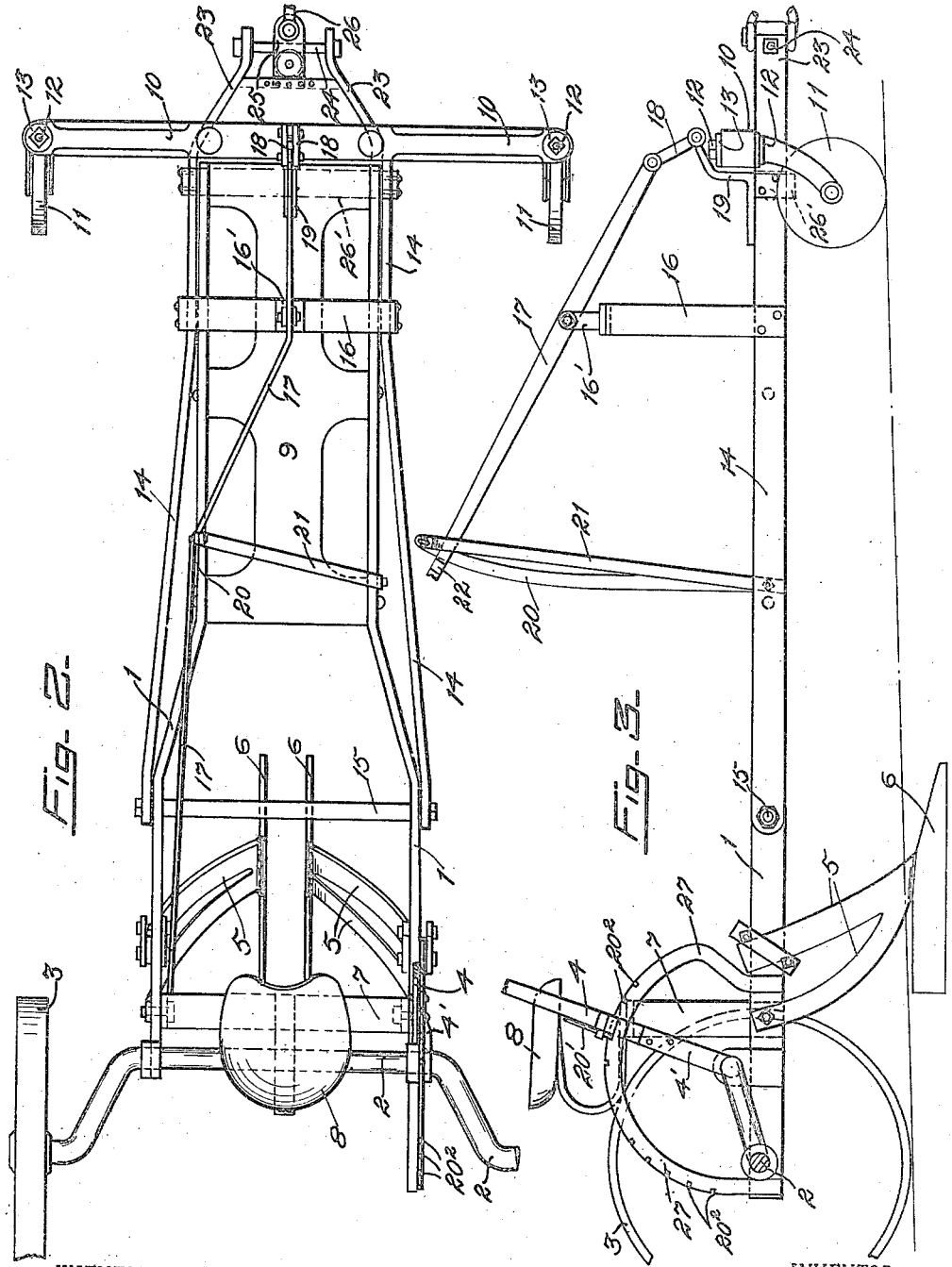

GARDNER A. TAYLOR, OF SALINAS, CALIFORNIA.

AGRICULTURAL IMPLEMENT.

1,248,034.  Specification of Letters Patent.  Patented Nov. 27, 1917.

Application filed October 25, 1915. Serial No. 57,776.

*To all whom it may concern:*

Be it known that I, GARDNER A. TAYLOR, a citizen of the United States, residing at Salinas, in the county of Monterey and State of California, have invented certain new and useful Improvements in Agricultural Implements, of which the following is a specification.

The hereinafter described invention relates to agricultural implements generally, including therein by said term wheeled road scrapers and implements of similar kinds, although the invention is more particularly applicable to that class of agricultural implements known as "beet plows" or those employed for removing the beets from the soil; the object of the invention being the production of a device wherein the plow blades may be removed from the soil and positioned for entrance therein with the expenditure of the least possible energy on the part of the operator of the device, and by so doing relieving him of the excessive strains at present required to be overcome during the operation of such devices.

Implements of the above character as at present constructed comprise a wheel structure, consisting of a main frame carrying the plow blades, which frame at its forward end is connected to an underlying wheel carrying beam in such a manner as to permit the frame being raised and lowered to remove the plow blades from within the soil and position the same for entrance therein, and to the forward end of the said vertically movable frame are attached the whiffle-tree and associated parts onto which the draft strain of the horses is placed during the operating moments of the implement. Obviously, under such constructed apparatus, the operator in raising the plow blades from within the soil is required not only to overcome the resistance offered by the soil opposing the removal of the plow blades, but equally so the entire weight of the frame structure, including the whiffle-tree and associated parts carried thereby, and also the pulling or draft strain of the horses tending to hold the plow blades within the soil, and these combined strains and weight are such as to make it exceedingly difficult for a single operator to quickly and effectively remove the plow blades from within the soil during the forward movement or travel of the implement, and which is required to be done throughout the day each time the plow or implement reaches the end of a row of beets being removed.

The essential feature of the present invention resides in constructing the implement with an adjustable frame and an adjusting frame, the relation between which said frames being such that in removing the plow blades from the soil the operator is only required to overcome the weight of the forward end portion of the main frame, and this is so slight as to place it within the power of an ordinary child to operate the implement, inasmuch as the heavy weight of the formerly constructed frame structure and its associated heavy parts and the draft resistance of the animals are disposed of.

To comprehend the invention, reference should be had to the accompanying sheets of drawings, wherein—

Figure 1 is a side elevation illustrating the position of the main or adjustable frame relative to the adjusting frame when the plow blades or cutting devices are removed from and placed above the soil.

Fig. 2 is a plan view of the apparatus.

Fig. 3 is a view similar to Fig. 1 of the drawings, illustrating the position of the frame structures and their associated parts when the plow blades are placed within the soil.

In the drawings, the numeral 1 is used to designate the adjustable main frame which carries in journals thereof the rear crank axle 2 to which the rear ground supporting wheels 3 are journaled, and which are thrown rearwardly and forwardly by the usual hand actuated shiftable lever 4 connected to an outwardly projected extension 4' attached to the axle 2. To the said main frame are attached the depending spaced standards 5, carrying at their lower ends the plow blades 6. The connections of the plow blades and rear ground wheels to the frame structure are of the usual construction, and call for no detail description herein. Above the rear portion of the main adjustable frame 1 and connected thereto by the supports 7 is situated the driver's seat 8.

The main frame 1 is constructed of metallic members and strengthened by the platform member 9, and said frame terminates at a point adjacent the cross beam 10 carrying the forward supporting ground wheels 11, which are connected to the wheel standards 12 journaled in bearings 13 of the beam 10.

The said cross beam 10 is bolted or otherwise attached to the forward end portion of the adjusting frame 14, which said frame is pivoted to the main adjustable frame 1 by means of the transverse tie rod 15, at a point a slight distance in advance of the rear end of said main frame.

From the adjusting frame 14, adjacent its forward end, is upwardly projected a yoked standard 16, and to a stud 16' carried thereby is fulcrumed a longitudinally disposed actuating lever 17. The rear end of this lever terminates at a point adjacent to the seat 8 within convenient reach of the operator, and the forward end of the said lever is pivoted to the upper end of a link 18, the lower end of which link is pivotally connected to a bracket 19 attached centrally to the forward end portion of the bed or platform 9 forming and constituting a portion of the frame 1.

From one side member of the main adjustable frame is upwardly projected an inwardly curved standard 20, the free upper end of which is connected to the opposing side member of the said frame by means of a securing brace standard 21. The lever 17 works and slides on the curved standard 20, through the medium of the guide strap 22 attached thereto, and may be held at any desired position either by friction or any other suitable means which is readily releasable, such as a pawl and ratchet mechanism, and which will enable the operator, positioned on seat 8, to hold the forward end of the main frame 1, at any desired position, thus regulating the depth of the blade 6 in the soil.

The forwardly projected end portions 23 of the adjusting frame 14 are united by means of the transverse rod 24, on which is slidably mounted the block 25 carrying the clevis 26 to which the whiffle-trees (not shown) are attached.

When in lowered position the adjustable main frame 1 at its forward ends rests on and is supported in its lowered position by the transverse support 26' which is secured to the adjusting frame 14 in any suitable manner.

In operation, when it is desired to raise the plow blades 6 out of and above the ground, the operator depresses the rear end portion of the actuating lever 17, which acting through its described connections causes the main adjustable frame to swing on its pivot connection relative to the adjusting frame 14 and raises the forward end portion of the main frame 1. As the lifting pressure is placed onto the forward end of the frame 1 the points of the plow blades are elevated at an upward inclination and gradually work out of the soil by reason of the forward draft pull of the horses attached to the plow structure, it being understood that the rear end portion of the actuating lever 17 is depressed to lift the plow blades during the forward movement of the plow. Under these conditions the pulling strain of the horses is taken advantage of and utilized in removing the plow blades from within the soil, the operator being thus only required to maintain a downward pressure on the actuating lever 17, sufficient to upwardly swing the adjustable frame as the plow blades move out of the soil. As the plow blades leave the soil, the operator throws the lever 4 to forwardly advance the rear wheels 3 to raise the rear end section of the adjustable frame 1, which serves to lift the plow blades a given distance above the surface of the ground, the wheels 3 being held in any given position by frictional contact of the lever 4 and quadrant 27 or by a coöperating pawl and ratchet mechanism carried by the lever 4 and quadrant 27.

To lower the plow blades it is only required that a reverse operation to that described in connection with the lifting of the blades be given to the connected associated parts.

By reason of the pivotal connection between the main swinging adjustable frame 1 and the adjusting frame 14, the lever strains are thrown onto the said frame 14, onto which all weight falls.

From the foregoing it will be seen that in order to lift the plow blades out of the soil, only such energy is required as will suffice to swing upwardly through the medium of the lever connections the forward end portion of the main adjustable frame. All resisting strains being eliminated, but slight power is required to operate the lever 17 to swing upwardly the main adjustable frame, in fact, this operation may be successfully carried out by a comparatively young boy.

The frame construction and associated parts herein employed for lifting the plow blades may be utilized in connection with any wheeled structure employing cutting, digging or scraping devices which are required to be lifted above the ground surface and out of contact with the soil, and I therefore do not wish by the expression "agricultural implement" to be understood as confining the invention to a plow construction.

I am well aware that changes and variations may be made in the working parts herein illustrated and described and therefore do not wish to be understood as limiting the invention thereto, but on the contrary wish to be understood as claiming the invention as broadly as the state of the art will permit.

Having thus described the invention, what is claimed as new and desired to be protected by Letters Patent is:—

A wheeled beet puller comprising a substantially oblong open main frame, and a substantially oblong adjusting frame without the main frame and pivoted adjacent to its rear to the side members of the main frame adjacent their longitudinal centers, a cross-bar extending transversely of the free end of the adjusting frame with its ends projecting beyond the sides thereof, a ground wheel pivotally mounted at each end of said cross bar for supporting the front end of the adjusting frame, a soil engaging implement carried adjacent to the rear end of the main frame, supporting wheels carried by the main frame adjacent to its rear for supporting the rear end of said main frame, a yoked standard secured to the adjusting frame in rear of the forward end of said main frame and in advance of the pivotal connecting points of said frames, an adjusting lever pivotally supported within its length on said yoke, a bracket carried by the forward end of the main frame for engaging the cross-bar to limit the downward movement of the front end of said main frame, and a link pivotally connecting the forward end of said lever and said bracket.

In testimony whereof I have signed my name to this specification in the presence of two subscribing witnesses.

GARDNER A. TAYLOR.

Witnesses:
W. M. PENCE,
FRANK S. CLARK.

Copies of this patent may be obtained for five cents each, by addressing the "Commissioner of Patents, Washington, D. C."